(12) United States Patent
Minami et al.

(10) Patent No.: US 6,886,221 B2
(45) Date of Patent: May 3, 2005

(54) FOLDING DEVICE AND ELECTRONIC EQUIPMENT USING THE SAME

(75) Inventors: Katsuichi Minami, Fukui (JP); Masaki Nakase, Fukui (JP); Koji Sakai, Fukui (JP); Takehiko Konja, Fukui (JP); Yasuchika Kudo, Fukui (JP); Yusho Nakase, Fukui (JP); Katsumasa Yamaguchi, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 126 days.

(21) Appl. No.: 10/364,361

(22) Filed: Feb. 12, 2003

(65) Prior Publication Data

US 2003/0153284 A1 Aug. 14, 2003

(30) Foreign Application Priority Data

Feb. 12, 2002 (JP) ........................................ 2002-033653

(51) Int. Cl.[7] ............................. E05D 11/10; E05F 1/08
(52) U.S. Cl. ............................. 16/324; 16/330; 16/326; 16/303; 379/433.13; 361/683
(58) Field of Search ....................... 16/324, 326, 327, 16/328, 330, 303, 331; 379/433.01, 433.05, 433.13; 455/575.3; 403/93, 95; 361/680–683, 725

(56) References Cited

U.S. PATENT DOCUMENTS

| | | | | |
|---|---|---|---|---|
| 5,109,571 A | * | 5/1992 | Ohshima et al. | 16/307 |
| 5,436,954 A | * | 7/1995 | Nishiyama et al. | 455/566 |
| 5,586,363 A | * | 12/1996 | Fanuzzi | 16/342 |
| 5,606,773 A | * | 3/1997 | Shappell | 16/298 |
| 5,704,094 A | * | 1/1998 | Hartigan et al. | 16/303 |
| 5,937,062 A | * | 8/1999 | Sun et al. | 379/433.13 |
| 5,987,122 A | * | 11/1999 | Daffara et al. | 379/433.13 |
| 6,141,831 A | * | 11/2000 | Novin et al. | 16/330 |
| 6,148,480 A | * | 11/2000 | Cooke | 16/303 |
| 2004/0052058 A1 | | 3/2004 | Minami et al. | |

FOREIGN PATENT DOCUMENTS

| | | | | |
|---|---|---|---|---|
| GB | 2392206 A | * | 2/2004 | ........... F16C/11/04 |
| JP | 2001-207721 | | 8/2001 | |
| JP | 2002-232535 | | 8/2002 | |
| JP | 2002364629 A | * | 12/2002 | ........... F16C/11/10 |
| JP | 2003120655 A | * | 4/2003 | ........... F16C/11/10 |
| JP | 2003-214423 | | 7/2003 | |
| JP | 2004150498 A | * | 5/2004 | ........... F16C/11/04 |
| WO | 03/042559 | | 5/2003 | |

* cited by examiner

Primary Examiner—Chuck Y. Mah
(74) Attorney, Agent, or Firm—Wenderoth, Lind & Ponack, L.L.P.

(57) ABSTRACT

A folding device contains a stationary part, a movable part disposed to be rotatable in flip-up (unfolding) and flip-down (folding) directions, a force-applying section disposed between the two parts, which urges the movable part in either direction according to a state of the movable part, a reversing section for allowing the force-applying section to change a direction of urging of the movable part into the flip-up (unfolding) direction when the movable part is in a folded state, and an actuator for operating the reversing section. Pressing the actuator being in the folded state allows the reversing section to switch the direction of urging of the movable part into flip-up (unfolding) direction. In the electronic equipment of the present invention, the stationary and the movable housings are connected to the stationary and the movable parts of the folding device, respectively. The structures can provide a folding device equipped with a simple one-hand flipping-up (unfolding), and electronic equipment using the device.

14 Claims, 11 Drawing Sheets

US 6,886,221 B2

FOLDING DEVICE AND ELECTRONIC EQUIPMENT USING THE SAME

FIELD OF THE INVENTION

The present invention relates to a folding device employed for electronic equipment, such as a mobile phone and a personal computer, and the electronic equipment using the same.

BACKGROUND ART

In recent years, electronic equipment including a mobile phone and a personal computer have been more compact but more sophisticated. In such a trend, as for the housing of electronic equipment, a foldable housing, which is formed of a stationary structure having a movable part foldably equipped therewith, has become popular. As a demand of the foldable housing, a folding device with ease in operation is now sought.

Now will be described a prior-art folding device and electronic equipment using the device, with reference to FIGS. 9 through 12C.

FIG. 9 shows a sectional view of a prior-art folding device, and FIG. 10 shows an exploded perspective view of the device. Generally cylindrical-shaped movable case 2 made of resin has through-hole 2B at its center, and through which cylindrical portion 1B of metallic movable shaft 1 is inserted. Edge portion 1A of movable shaft 1 contacts with stepped portion 2A formed on the right side of movable case 2, preventing shaft 1 from rotating in case 2. Metallic movable part 4 has generally oval-shaped through-hole 4A at its center. Holding portion 1C of movable shaft 1 is inserted in through-hole 4A, whereby movable part 4 is supported movably for axial motion with respect to shaft 1. At the same time, movable part 4 is urged in the axial direction by spring 3. Metallic wire spring 3 is accommodated, being somewhat compressed, in the interior of movable case 2. Metallic stationary part 6 has through-hole 6A at its center. The tip of cylindrical portion 1B of shaft 1 is rotatably inserted in through-hole 6A. Movable cams 5A and 5B are disposed on movable part 4 to provide click-stopped folding. Cam 5A resiliently contacts with stationary cam 7A of stationary part 6, while cam 5B disposed opposite to cam 5A contacts with stationary cam 7B of part 6. Holder tip 1D of movable shaft 1 is inserted through case 2, movable part 4, and stationary part 6, and then fixed by metallic C-ring 8. Stationary part 6 rotatably holds movable shaft 1, movable case 2 and movable part 4. In this way, the whole structure forms folding device 9.

Next will be described electronic equipment using such structured folding device 9, with reference to FIGS. 11A–C showing a side view of the equipment. Stationary housing 41 made of electrical insulating resin has operating section 43 on its upper surface. Operating section 43 is formed of a plurality of keys. On the other hand, movable housing 42, which is also made of electrical insulating resin, has display 44 including a liquid crystal display (LCD) on its surface. Stationary part 6 of folding device 9 is mounted on one end of stationary housing 41, while movable case 2 of device 9 is mounted on one end of movable housing 42. As a result, folding device 9 holds housing 42 so as to be foldable over housing 41.

Now will be described the folding motion in the folding device structured above and electronic equipment using the device, with reference to FIGS. 11A through 12C. Firstly, the explanation is given on the "folded" state, as shown in FIG. 11A, in which the surface of movable housing 42 is folded over the upper surface of stationary housing 41. In folding device 9 shown in FIG. 12A, movable cam 5A of movable part 4 urged by spring 3 engages with stationary cam 7A of stationary part 6, maintaining two housings 41 and 42 in the folded status. When a user rotates housing 42 by hand against the spring-urged force in a direction that housing 42 is raised from housing 41, cam 5A of movable part 4, via movable case 2 held by movable housing 42, rotatively moves against the spring-urged force toward ramp 7C. Next, the explanation is given on the process to the "half-opened" state as shown in FIG. 11B. The user further rotates housing 42 until it stands nearly vertical to stationary housing 41. As shown in FIG. 12B, when the rotating motion rotates movable part 4 via movable case 2 with respect to stationary part 6 of device 9, movable cam 5A rotatively moves onto flat portion 7D on the upper surface of stationary part 6. Further rotating motion brings two housings 41 and 42 in the "full-opened" state, as shown in FIG. 11C. At the moment, movable cam 5B disposed opposite to cam 5A engages with stationary cam 7A, maintaining two housings 41 and 42 in the full-opened state as shown in FIG. 12C. To fold movable housing 42 over housing 41, the user reversely rotates housing 42 by hand. The folding operation of housing 42 is thus structured.

In the prior-art folding device and the electronic equipment using the device, however, there have been some inconveniencies—when opening up housing 42 from its "folded" state, the user has to flip it up against the force urged by spring 3. Therefore, stationary housing 41 has to be held with one hand, while movable housing 42 is flipped up (unfolded) with the other. The fact that the flip-up (unfolding) motion cannot be done as a one-hand operation may not be user-friendly.

SUMMARY OF THE INVENTION

The folding device of the present invention contains i) a stationary part; ii) a movable part rotatably disposed so as to move in flip-up (unfolding) and flip-down (folding) directions with respect to the stationary part; iii) a force-applying section disposed between the two parts, which urges the movable part in the flip-up (unfolding) or flip-down (folding) directions depending on a state the movable part has; iv) a reversing section that allows the force-applying section to change the direction of urging of the movable part from the flip-down (folding) direction to the flip-up (unfolding) direction, when the device gets into the folded state; and v) an actuator for operating the reversing section. Pushing the actuator in the folded state works on the reversing section, switching the direction of urging of the movable part into the flip-up (unfolding) direction. In the electronic equipment of the present invention, the stationary part of the folding device described above is connected to a stationary housing, and the movable part is connected to a movable housing.

DETAILED DESCRIPTION OF THE INVENTION

Exemplary Embodiment

An embodiment of the present invention is described hereinafter with reference to the accompanying drawings, FIG. 1 through FIG. 8.

Figure 1:
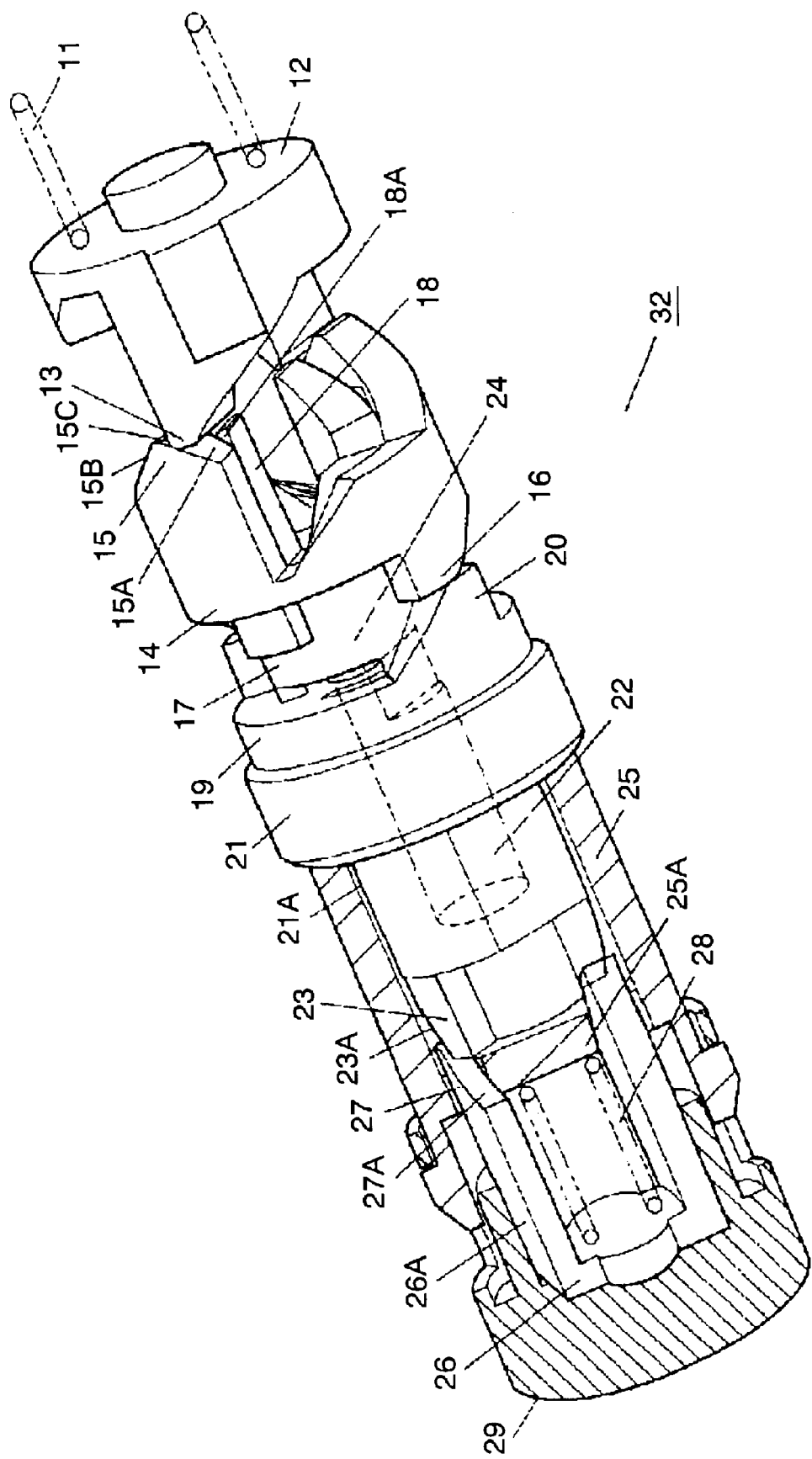
FIG. 1 is a perspective view of the essential part of a folding device of an embodiment of the present invention.
Figure 2:
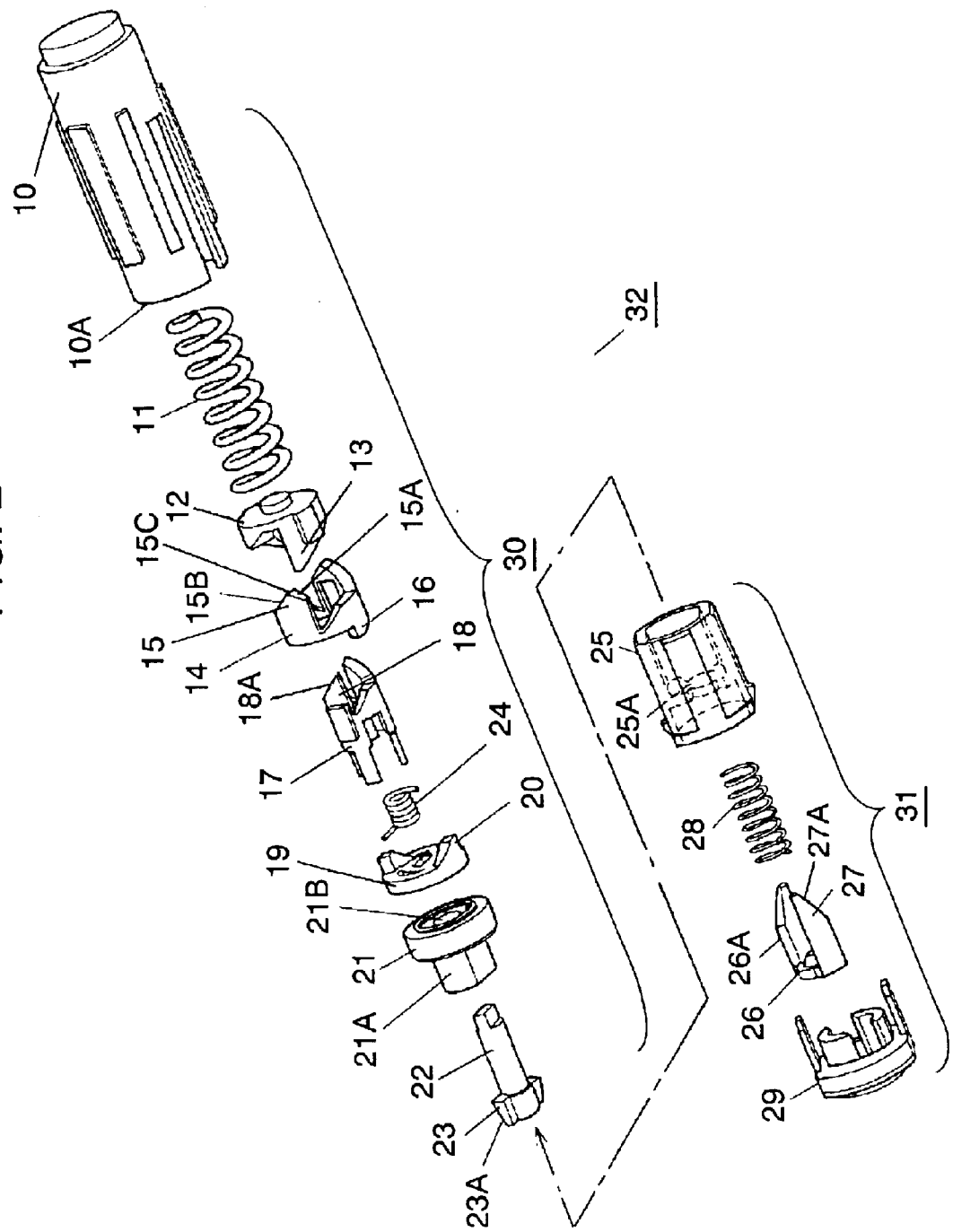
FIG. 2 is an exploded perspective view of the folding device of the embodiment of the present invention.
Figure 3:
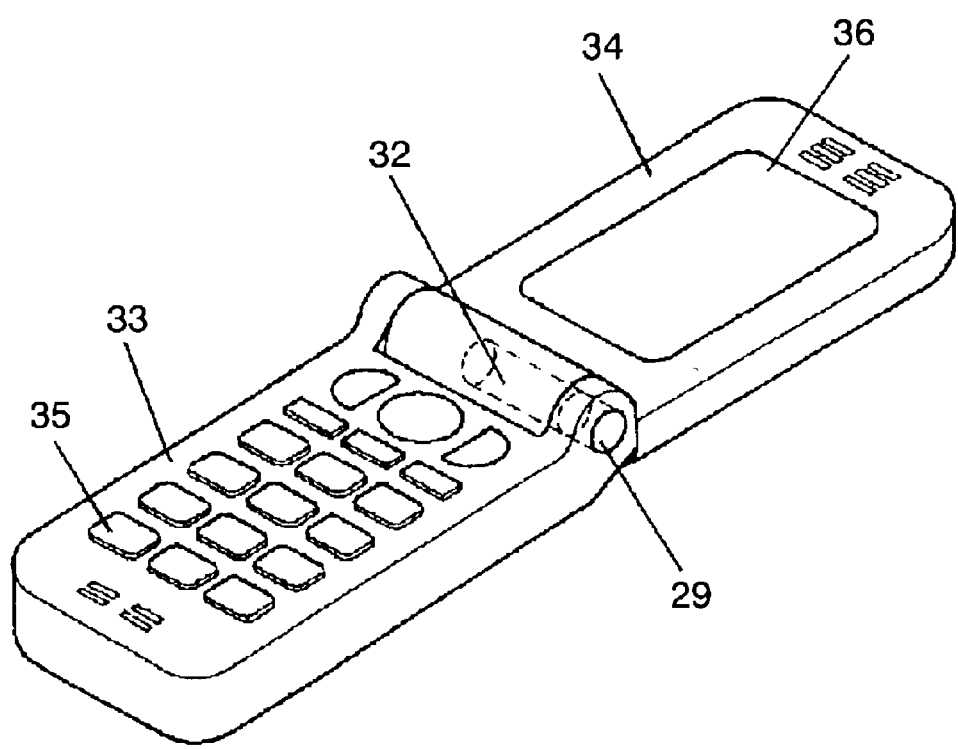
FIG. 3 is a perspective view of electronic equipment using the folding device of the embodiment of the present invention.

FIG. 1 is a perspective view of the essential part of a folding device of the embodiment of the present invention, and FIG. 2 is an exploded perspective view of the device.

Generally cylindrical-shaped movable case 10 made of resin has opening 10A on the left side thereof. A groove extended from opening 10A is disposed in the periphery of case 10. In addition, case 10 accommodates metallic wire coiled spring 11 in slightly compressed condition. Being urged by spring 11 from the right side, generally cylindrical-shaped metallic movable part 12 is disposed next to spring 11. Movable part 12 has a projection on its side. The projection fits through the groove of movable case 10, so that movable part 12 can move in the axial direction in case 10. Movable part 12 has triangular projected movable cam 13 on the left side thereof, that is, in the direction urged by spring 11.

Generally cylindrical-shaped metallic slider 14 has a hollow in its middle. Disposed on the right side of the periphery of slider 14 is stationary cam 15, which is formed of two ramps 15A and 15B bounded by tip 15C. Under the urge of spring 11, the tip of movable cam 13 of movable part 12 resiliently contacts with ramp 15A of the lower side of stationary cam 15. A force-applying section of the folding device is thus structured.

Generally cylindrical-shaped metallic reversing part 17 is situated in the hollow of slider 14. On the right side of the periphery of reversing part 17, reverse cam 18 is disposed opposite to movable cam 13. Reverse cam 18 has upwardly inclined ramp 18A. Generally discoid metallic releaser 19 has generally trapezoidal release cam 20 on its right side. Releaser 19 is urged in rotating direction to reversing part 17 via coiled return spring 24 made of metallic wire. That is, return spring 24 is placed between releaser 19 and reversing part 17 so as to engage both ends with each of releaser 19 and reversing part 17, thereby urging releaser 19. Generally cylindrical-shaped metallic release shaft 22 has generally triangular change cam 23 on its left end. On the right end of release shaft 22, releaser 19 is fixed. A reversing section of the folding device is thus structured.

Folding section 30 has generally cylindrical-shaped metallic stationary part 21. Hereinafter will be described the details of the reversing section in association with the stationary part and the force-applying section. Stationary part 21 has engaging section 21A on its left side. On the right side of part 21, reversing part 17 is fixed with a predetermined space. Release shaft 22 is rotatably inserted in through-hole 21B formed in the center of part 21. Releaser 19 is fixed at the right end of release shaft 22. Releaser 19 is situated, so as to be rotatable through an angle, between stationary part 21 and reversing part 17 (with slider 14). Slider 14 has generally trapezoidal support cam 16 on the periphery of the left side. The tip of support cam 16 resiliently contacts with the tip of release cam 20, under the urging of spring 11 from the right side via stationary cam 15 and movable cam 13 of movable part 12. Now rotating releaser 19 against the force urged by return spring 24 allows release cam 20 to rotate and go out of engagement with support cam 16. Slider 14 and stationary cam 15 slide toward stationary part 21. Furthermore, movable cam 13 slides from ramp 15A of stationary cam 15 onto ramp 18A of reverse cam 18. Folding section 30, as described above, contains movable case 10, movable part 12, the force-applying section, the reversing section, and stationary part 21.

On the other hand, pressing section 31 contains generally cylindrical-shaped actuator case 25 made of resin, metallic actuator 26, and coiled control return spring 28 made of a metal wire. Actuator 26 having generally triangulated actuator cam 27 at the tip of leg 26A is slidably housed in actuator case 25. Actuator return spring 28, which is disposed in a slightly compressed condition—between actuator 26 and inner wall 25A of actuator case 25, urges actuator 26 toward the left, i.e., in the return direction. When actuator 26 moves toward stationary part 21, ramp 27A formed on actuator cam 27 contacts with ramp 23A formed on change cam 23 of release shaft 22. At this moment, the engagement between ramps 23A and 27A rotates release shaft 22 and releaser 19 connected therewith. Resin-made push button 29 is engaged to the opening formed on the left side of actuator case 25 so as to be movable toward stationary part 21. Holders projected on the right side of button 29 hold actuator 26. Pressing section 31 is thus structured.

Connection between folding section 30 and pressing section 31 is made by fitting engaging section 21A with the opening on the right side of actuator case 25. Between movable case 10 and stationary part 21 of folding section 30, the following parts are disposed on a substantially the same axial line: spring 11; movable part 12; slider 14; reversing part 17; releaser 19; release shaft 22; and return spring 24. Similarly, pressing section 31 has push button 29, actuator 26, actuator return spring 28, and actuator case 25 on substantially the same axial line. Such structured folding section 30 and pressing section 31 form into folding device 32.

Next will be described electronic equipment using aforementioned folding device 32. Here in the embodiment, a mobile phone is given as an example of such equipment, with reference to the perspective view of the electronic equipment shown in FIG. 3. Stationary housing 33 made of electrical insulated resin has, on its upper surface, operating section 35 formed of a plurality of keys, and a voice-input section including a microphone. On the other hand, movable housing 34, which is also made of electrical insulated resin, has informing section 36 including a liquid crystal display (LCD) and a voice-output section typified by a loudspeaker on the upper surface. The outer periphery of actuator case 25 of folding device 32 is held by an end of stationary housing 33, while the outer periphery of movable case 10 is held by the end of movable housing 34. With such a structure, folding device 32 allows housing 34 to foldably move with respect to housing 33 in the electronic equipment.

Figure 4A:
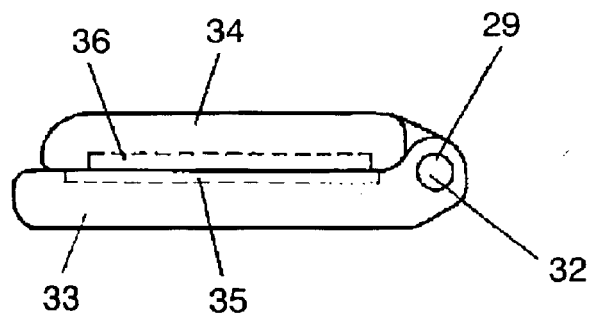
FIG. 4A through FIG. 4C are side views of the electronic equipment shown in FIG. 3 at different positions in folding operation.
Figure 4B:
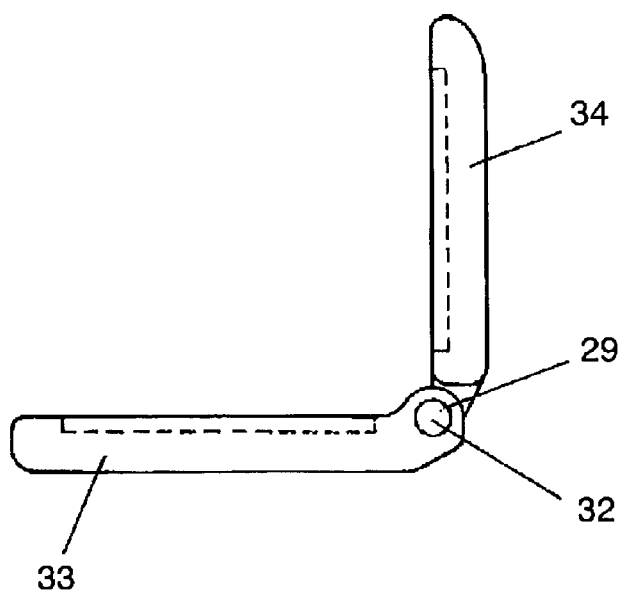
Figure 4C:
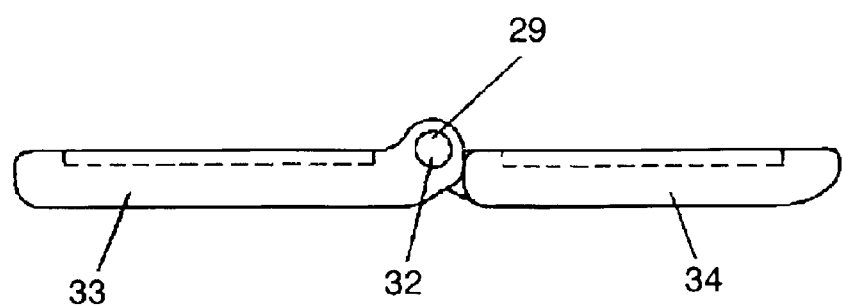

Next will be described the workings of such structured folding device employed for electronic equipment, with reference to FIGS. 4A through 4C, and FIGS. 5A through 7B. FIGS. 4A through 4C show side views of the electronic equipment at different positions in folding operation. FIGS. 5A through 7B show sectional views of the essential part of the folding device in folding operation. It will be noted that each view of FIGS. 5A through 7B may not give a "clear-cut" section; for easier understanding of the structure, the essential part is shown on an identical plane. In addition, releaser 19 and release shaft 22 are shown in the drawings, for convenience, as an integrated structure due to their working in engagement.

First will be described the folding operation of movable housing 34 and stationary housing 33 by hand. FIG. 4A shows the "folded" state, in which the top face of housing 34 is folded over the top face of housing 33. In folding device 32 in the state shown in FIG. 5A, movable cam 13 of movable part 12, which is urged by spring 11, resiliently contacts with ramp 15A of stationary cam 15. That is, movable part 12 is held by cam 15 of slider 14 of the force-applying section, being urged to the right, i.e., in the flip-down (folding) direction.

When a user flips up (unfolds) movable housing 34 by hand as shown in FIG. 4B, movable case 10 rotates as housing 34 rises. The movement of case 10 rotates movable part 12 engaged with the groove of case 10, allowing movable cam 13 to move in the left direction against the urged force toward the right, as shown in FIG. 5B. Next, cam 13 slides up ramp 15A of stationary cam 15 and goes over tip 15C onto ramp 15B with a resilient contact as shown in FIG. 5C. Movable part 12 is now urged in the left, i.e., in the flip-up (unfolding) direction by stationary cam 15 of slider 14 of the force-applying section.

From the "half-opened" position, the user further moves housing 34 until the housing takes the "full-opened" position as shown in FIG. 4C. In the process to the filly opened position, movable cam 13 resiliently slides on ramp 15B of stationary cam 15, and finally, as shown in FIG. 5D, cam 13 settles on the left end of ramp 15B, whereby movable part 12 is held with the urge of spring 11 in the left, i.e., in the flip-up (unfolding) direction.

Figure 5A:
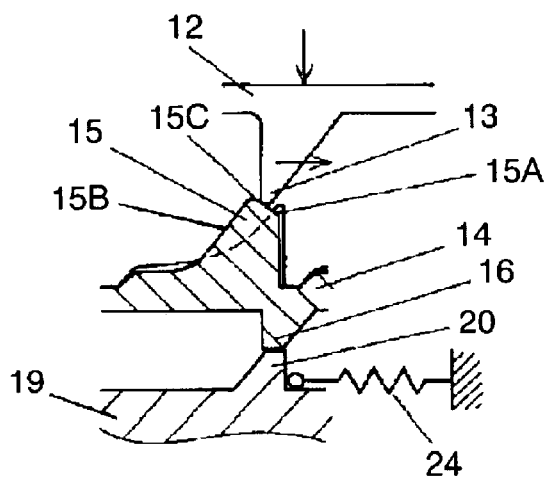
FIG. 5A through FIG. 5D are sectional views illustrating the essential part of the folding device in folding operation of the embodiment of the present invention.
Figure 5C:
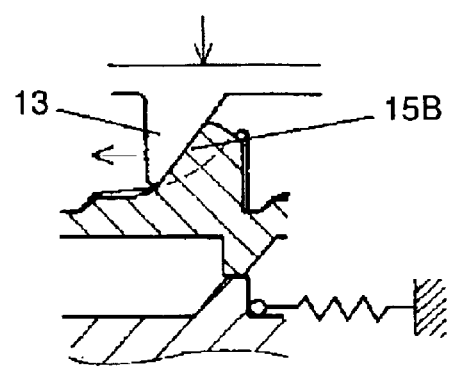
Figure 5B:
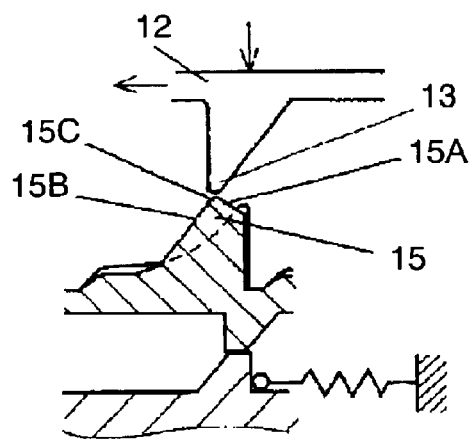
Figure 5D:
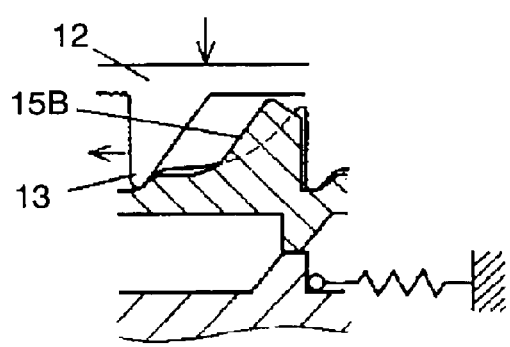

When the user flips down (folds) movable housing 34 on stationary housing 33 by hand, cam 13 slides over cam 15 following the aforementioned process in reverse, i.e., in the order of FIGS. 5C, through 5B, to 5A. The folding motion between housings 33 and 34 is thus provided. In the motion, movable part 12 and stationary part 21 rotate in the direction of flip-up (unfolding) or flip-down (folding) with each other.

Now will be described the folding operation using push button 29 of folding device 32. In this case, movable housing 34 is flipped up (unfolded) by pressing button 29, not by directly moving the housing by hand.

Figure 6A:
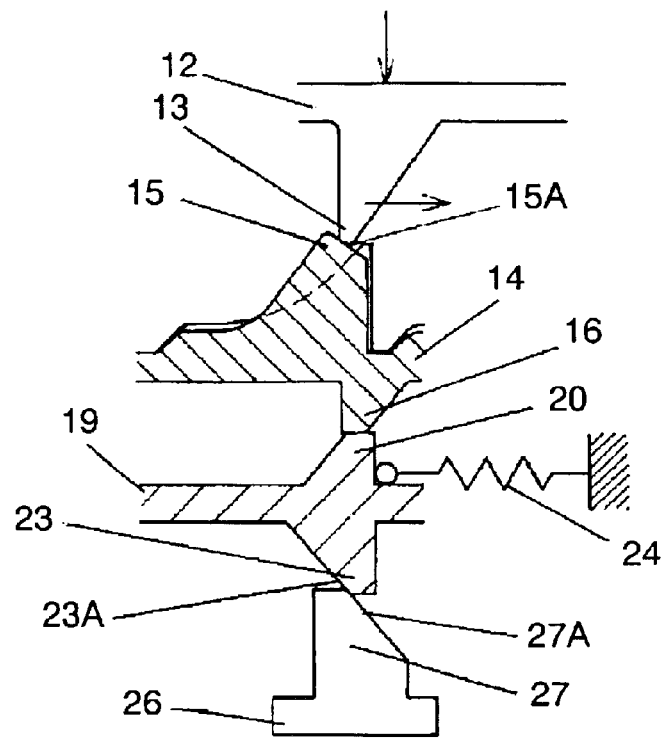
FIGS. 6A and 6B are sectional views illustrating the essential part of the folding device when pressing force is applied to the device of the embodiment of the present invention.
Figure 6B:
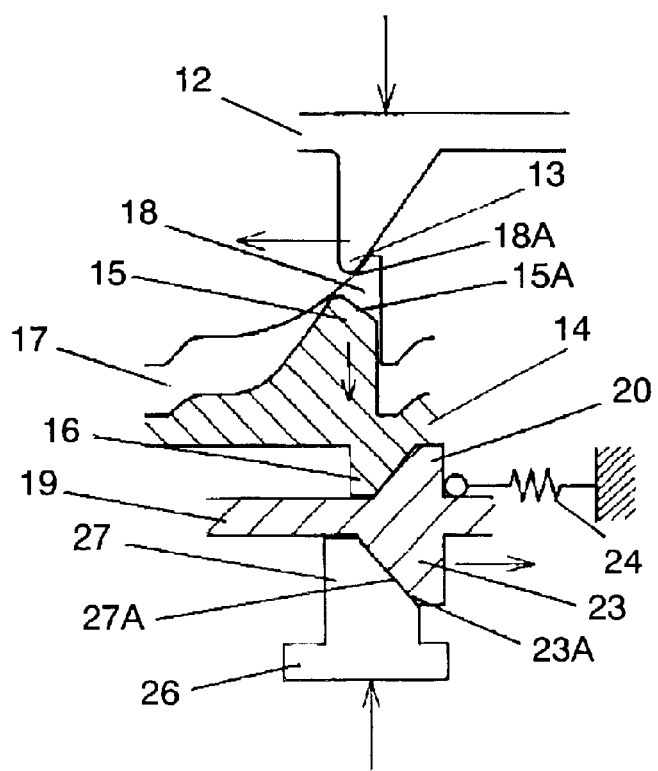

When movable housing 34 is in the folded state as shown in FIG. 4A, movable cam 13 resiliently contacts with ramp 15A of stationary cam 15 as shown in FIG. 6A. That is, movable part 12 is held by cam 15, being urged to the right, i.e., in the flip-down (folded) direction. Now, pressing push button 29 allows ramp 27A of actuator cam 27 of actuator 26 held by button 29 to move up toward stationary part 21 while pushing ramp 23A of release shaft 22. In the wake of the movement, releaser 19 of the reversing section rotatively moves in the right direction against the force urged by return spring 24, as shown in FIG. 6B. Release cam 20 also rotatively moves in the right direction to come off the tip of support cam 16. Under the urge of movable cam 13, slider 14 moves down, i.e., in the direction of stationary part 21. The downward motion of slider 14 allows cam 13 to get away from ramp 15A of cam 15 then slide in the left direction down on ramp 18A having an incline opposite to that of ramp 15A. In this way, the reversing section operated (rotated and slided) by the actuator allows movable part 12 in the folded state as shown in FIG. 6A to be urged in the left direction, rotatively moving it in the flip-up (unfolding) direction. Through the process, movable housing 34 equipped with movable part 12 via case 10 flips up (unfolds).

Figure 7A:
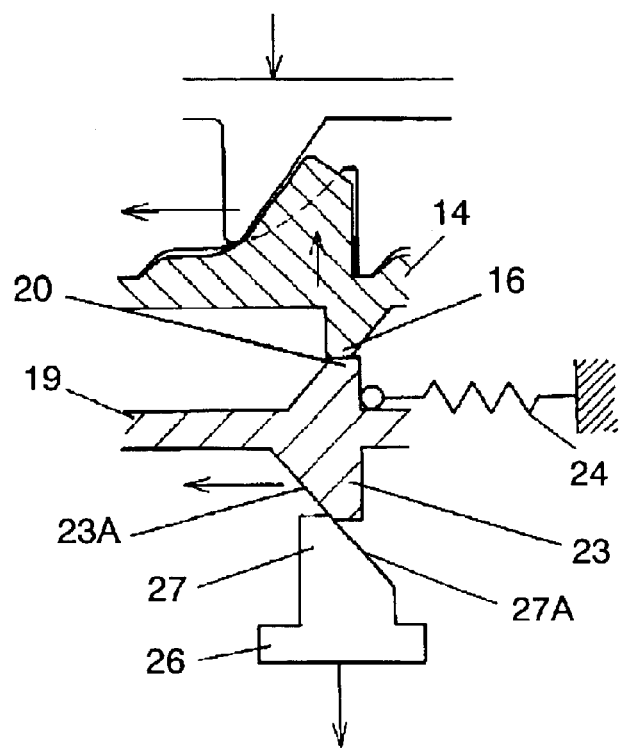
FIGS. 7A and 7B are sectional views illustrating the essential part of the folding device when the pressing force is released.

When the pressing force on push button 29 is released, releaser 19 urged by return spring 24 moves in the left direction, accordingly, slider 14 is pushed up, as shown in FIG. 7A. The upward movement of slider 14 brings release cam 20 and support cam 16 back in the original position in which the tips of the cams make contact with each other. The urging forces of springs 24 and 28 push down actuator 26 and push button 29 via releaser 19 and change cam 23 of release shaft 22. In this way, actuator 26 and button 29 return to the original position before the pressing force is applied.

Figure 7B:
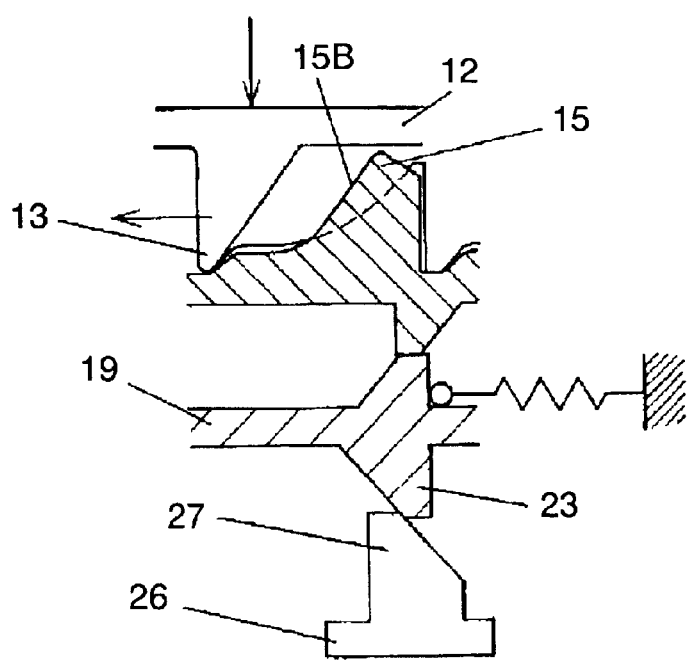

When the two housings are in the "full-opened" state, as shown in FIG. 4C, in which housing 34 is fully extended with respect to housing 33, the engagement of related components is shown in FIG. 7B—in the state, resilient contact of movable cam 13 with the left end of ramp 15B of cam 15 holds movable part 12, urging to the left, i.e., in the flip-up (unfolding) direction.

To bring housings 33 and 34 into the folded state, the user flips down (folds) housing 34 by hand. Like in the aforementioned manual folding operation, the related components change the engagement in order of the status from FIG. 5D through FIGS. 5C, 5B, to FIG. 5A, as movable housing 34 is operated.

According to this embodiment, as described above, movable cam 13 of movable part 12 urged by spring 11 resiliently settles on a predetermined position on stationary cam 15 of slider 14. Through the motion, movable part 12 is urged in a direction according to the state of the folding device—in the opened state, movable part 12 is to be urged in the flip-up (unfolding) direction with respect to stationary part 21, whereas in the folded state, toward the flip-down (folding) direction. Applying a pressing force to actuator 26 contacts actuator cam 27 with change cam 23 of releaser 19, thereby rotatively moving releaser 19. As releaser 19 rotatively moves, release cam 20 comes off support cam 16 of slider 14, and slider 14 slides toward stationary part 21. Following the movement, movable cam 13 "transfers" from stationary cam 15 to reverse cam 18 with resilient contact, urging movable part 12. The movement changes the urging direction of movable part 12 from the flip-down (folding) to the flip-up (unfolding) direction. Employing such structured folding device 32 realizes a one-hand flip-up (unfolding) of the housings. That is, movable housing 34 can be flipped up (unfolded) from its folded state by pressing button 29 by one hand, in addition to the conventional manual flip-up (unfolding) and down (folding) of the housings. It is therefore possible to provide a folding device with easy folding operation and electronic equipment using the device.

Besides, the folding device contains the components spring 11, movable part 12, slider 14, reversing part 17, releaser 19, stationary part 21, and actuator 26—aligned in a row with the same axial line. Such an arrangement can minimize any protruding portion in the entire structure in peripheral direction, allowing the device to be easily downsized.

Although folding device 32 described above is formed of folding section 30 connected with pressing section 31, it is not limited thereto. Actuator case 25 may be eliminated from pressing section 31, and instead, a casing as a substitute for actuator case 25 may form on the stationary part. In this case, actuator return spring 28 and actuator 26 should be accommodated in the casing, and to which, push button 29 is attached. As a result, folding section 30 and pressing section 31 can be structured in one piece.

It is also possible to form releaser 19 integrally with release shaft 22.

Figure 8:
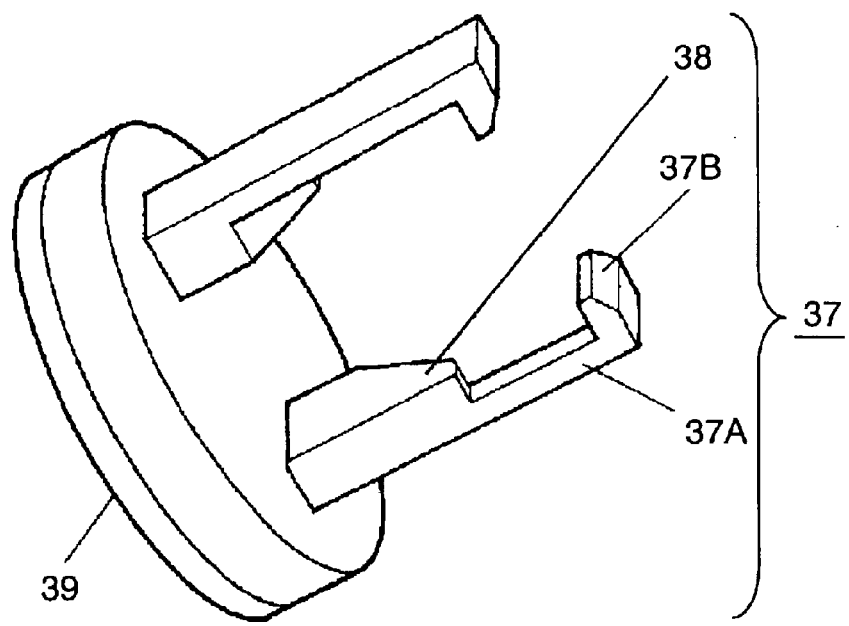
FIG. 8 is a perspective view illustrating an actuator of the folding device of another embodiment of the present invention.
Figure 9:
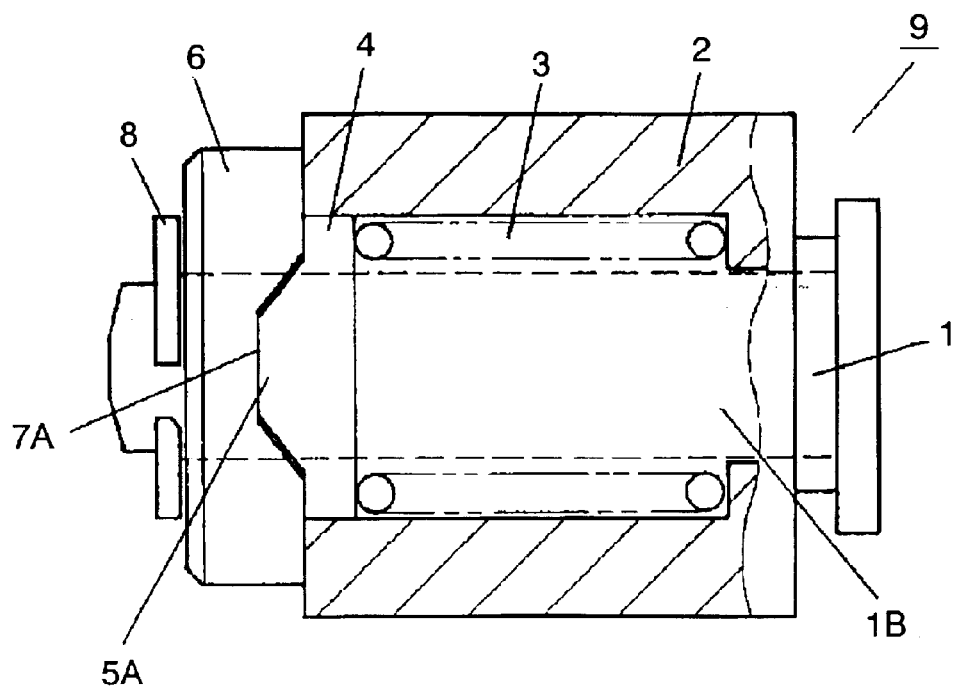
FIG. 9 is a sectional view of a prior-art folding device.
Figure 10:
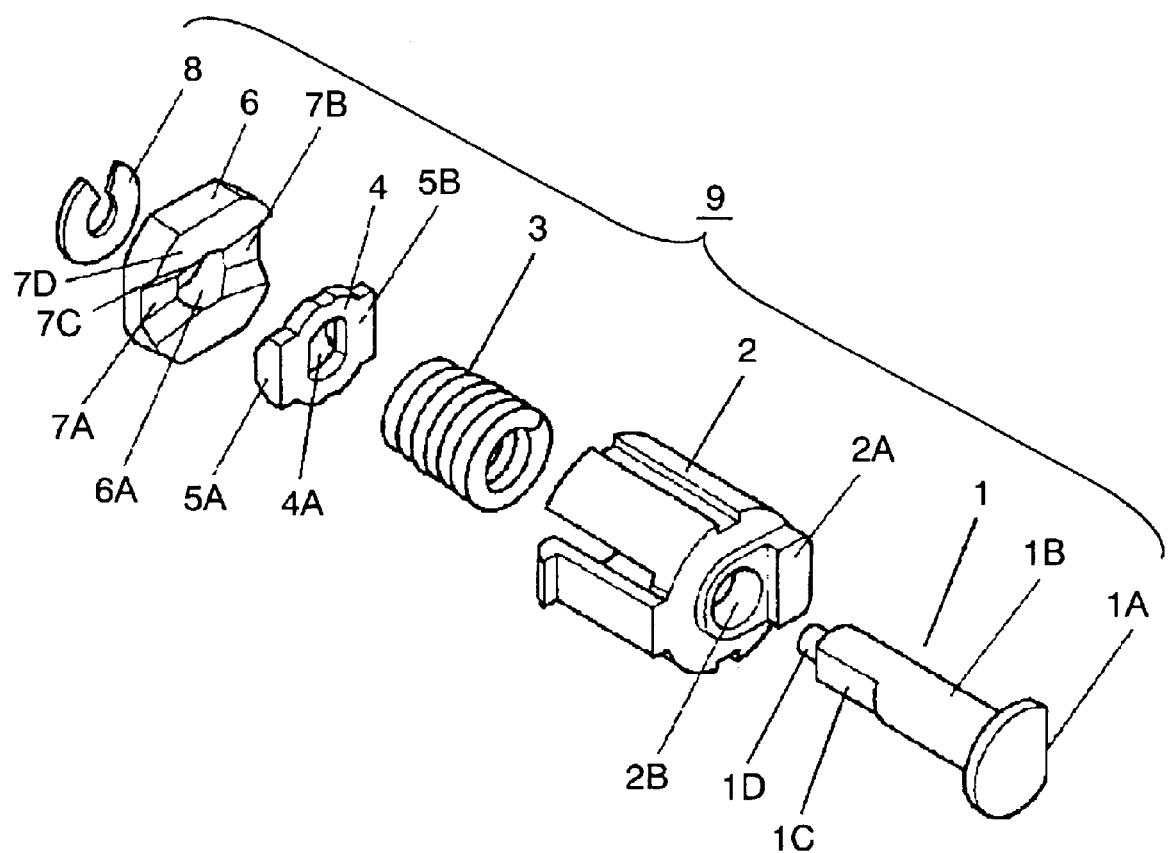
FIG. 10 is an exploded perspective view of the prior-art folding device.
Figure 11A:
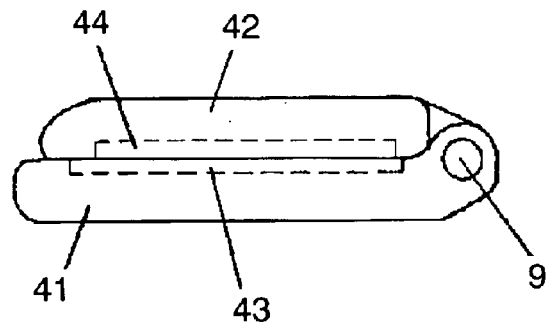
FIG. 11A through FIG. 11C are side views of electronic equipment using the prior-art folding device at different positions in folding operation.
Figure 11B:
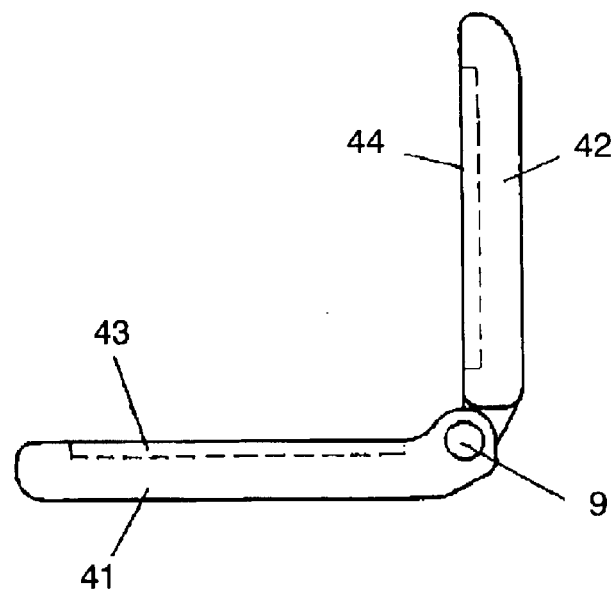
Figure 11C:
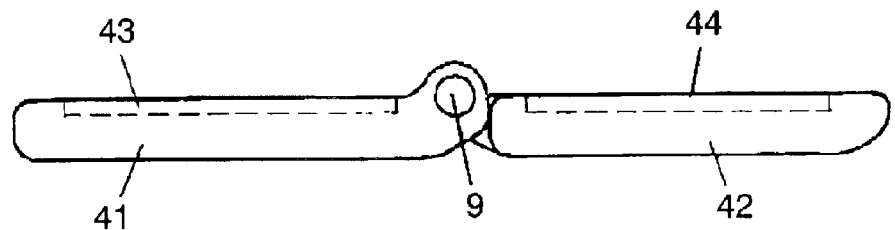
Figure 12A:
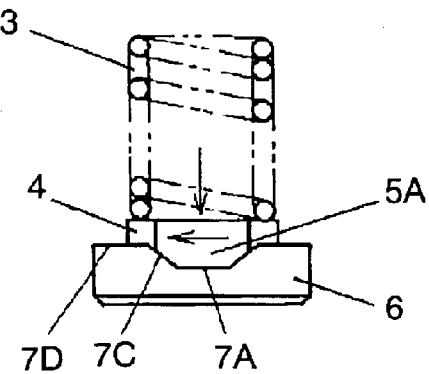
FIG. 12A through FIG. 12C are sectional views of the essential part of the prior-art folding device at different positions in the folding operation.
Figure 12B:
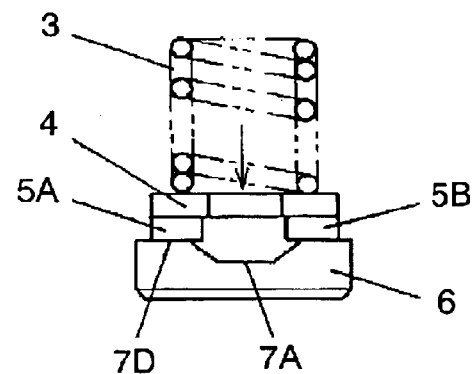
Figure 12C:
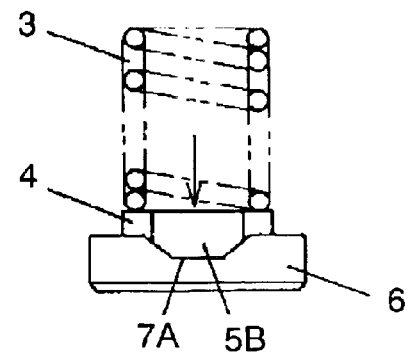

Although the aforementioned explanation introduces pressing section 31 that is formed of push button 29, actuator 26, return spring 28, and actuator case 25, it is not limited thereto. Actuator 37 shown in FIG. 8 is used as a substitute for pressing section 31. A pair of actuator cams 38 is disposed at an intermediate section of actuator 37, and pressing section 39 corresponding to push button 29 is disposed over the left side of the actuator. Engaging each pawl 37B at each tip of legs 37A with stationary part 21 allows actuator 37 to be latchably secured and movable in the pressing direction. The present invention is adaptable to the structure above.

As for the material of the folding device of the embodiment, metal is employed for movable part 12, slider 14, reversing part 17, releaser 19, stationary part 21, release shaft 22, and actuator 26. However, other materials, for example, resin, may be used, provided that they can endure the repeated sliding movements.

What is claimed is:

1. A folding device comprising:
   a stationary part:
   a movable part disposed to be rotatable in unfolding and folding directions with respect to said stationary part, said movable part having a movable cam;
   a force-applying section operable to urge said movable part in the unfolding direction when said movable part is in an unfolded state, and in the folding direction when said movable part is in a folded state, said force-applying section comprising a spring for urging said movable cam of said movable part toward said stationary part, and a slider, said slider having a stationary cam disposed opposite to said movable cam and adapted to contact said movable cam, and a support cam disposed on a side opposite to said stationary cam;
   a reversing section for allowing said force-applying section to change a direction of urging of said movable part from the folding direction to the unfolding direction when said movable part is in the folded state, said reversing section comprising a releaser having a release cam adapted to make resilient contact with said movable cam, and a reversing part fixed to said stationary part and having a reversing cam adapted to make resilient contact with said movable cam in response to disengagement of said movable cam from said stationary cam; and
   an actuator for operating said reversing section when a pressing force is applied to said actuator in the folded state.

2. The folding device of claim 1, wherein said force-applying section urges said movable part in the unfolding direction when said movable part is in the unfolded state and urges said movable part in the folding direction when said movable part is in the folded state, in response to engagement of said movable cam with a predetermined position on said stationary cam.

3. The folding device of claim 2, wherein said stationary cam has a first ramp and a second ramp, when said movable cam contacts said first ramp, said movable cam is urged in the unfolding direction, and when said movable cam contacts said second ramp, said movable cam is urged in the folding direction.

4. The folding device of claim 1, further comprising a release shaft engaging with said releaser and having a change cam disposed on a side opposite to a side engaged with said releaser, wherein said actuator has an actuating cam for rotatively moving said releaser by contacting said change cam.

5. The folding device of claim 4, wherein said releaser and said release shaft are integrated in as one structure.

6. The folding device of claim 4, wherein said movable part changes rotating direction from the folding direction to the unfolding direction by said actuating cam rotatively moving said releaser by contacting said change cam, said release cam disengaging from said support cam in response to the rotative movement of said releaser and said slider sliding toward said stationary part, and said movable cam moving from said stationary cam to contact said reverse cam.

7. The folding device of claim 1, further comprising a movable case engaged with said movable part, said movable case rotating as said movable part rotates.

8. The folding device of claim 1, further comprising an actuator case engaging with said stationary part.

9. The folding device of claim 1, wherein said reversing section further includes a return spring engaged with said releaser and said reversing part, said return spring being adapted to urge said releaser in a rotating direction.

10. The folding device of claim 1, further comprising an actuating return spring adapted to urge said actuator in a direction away from said reversing section.

11. The folding device of claim 1, further comprising a push button for applying a pressing force to said actuator.

12. The folding device of claim 1, wherein said spring, said slider, said reversing part, said releaser, said stationary part, and said actuator are aligned in a row having an identical axial line.

13. An electronic device comprising:
    a folding device including:
       a stationary part;
       a movable part adapted to be rotatable in unfolding and folding directions with respect to said stationary part, said movable part having a movable cam;
       a force-applying section operable to urge said movable part in the unfolding direction when said movable part is in an unfolded state, and in the folding direction when said movable part is in a folded state, said force-applying section comprising a spring for urging said movable cam of said movable part toward said stationary part, and a slider, said slider having a stationary cam disposed opposite to said movable cam and adapted to contact said movable cam, and a support cam disposed on a side opposite to said stationary cam;
       a reversing section for allowing said force-applying section to change a direction of urging of said movable part from the folding direction to the unfolding direction when said movable part is in the folded state, said reversing section comprising a releaser having a release cam adapted to make resilient contact with said movable cam, and a reversing part fixed to said stationary part and having a reversing cam adapted to make resilient contact with said movable cam in response to disengagement of said moveable cam from said stationary cam; and an actuator for operating said reversing section when a pressing force is applied to said actuator in the folded state;

a stationary housing connected to said stationary part; and a movable housing connected to said movable part.

14. The electronic equipment of claim 13, wherein said stationary housing includes at least one of an operating section and a voice-input section on a top surface of said stationary housing, and said movable housing includes at least one of an informing section and a voice-output section on a top surface of said movable housing.

* * * * *

UNITED STATES PATENT AND TRADEMARK OFFICE
CERTIFICATE OF CORRECTION

PATENT NO. : 6,886,221 B2
DATED : May 3, 2005
INVENTOR(S) : Katsuichi Minami et al.

It is certified that error appears in the above-identified patent and that said Letters Patent is hereby corrected as shown below:

Column 7,
Lines 56 and 57, please replace "movable" with -- support --.

Column 9,
Lines 2 and 3, please replace "movable" with -- support --.

Signed and Sealed this

Thirteenth Day of December, 2005

JON W. DUDAS
*Director of the United States Patent and Trademark Office*